(12) United States Patent
Huang

(10) Patent No.: US 9,312,630 B2
(45) Date of Patent: Apr. 12, 2016

(54) LOCKING CONNECTORS AND RELATED METHODS

(71) Applicant: BAL SEAL ENGINEERING, INC., Foothill Ranch, CA (US)

(72) Inventor: Michelle Huang, Foothill Ranch, CA (US)

(73) Assignee: Bal Seal Engineering, Inc., Foothill Ranch, CA (US)

(*) Notice: Subject to any disclaimer, the term of this patent is extended or adjusted under 35 U.S.C. 154(b) by 210 days.

(21) Appl. No.: 14/109,730

(22) Filed: Dec. 17, 2013

(65) Prior Publication Data

US 2014/0179148 A1 Jun. 26, 2014

Related U.S. Application Data

(60) Provisional application No. 61/740,647, filed on Dec. 21, 2012.

(51) Int. Cl.
| | |
|---|---|
| B25G 3/00 | (2006.01) |
| H01R 13/62 | (2006.01) |
| F16B 21/18 | (2006.01) |
| F16B 21/06 | (2006.01) |

(52) U.S. Cl.
CPC .............. *H01R 13/62* (2013.01); *F16B 21/186* (2013.01); *F16B 21/065* (2013.01)

(58) Field of Classification Search
CPC . Y10T 403/58; Y10T 403/60; Y10T 403/602; Y10T 403/70; Y10T 403/7061; Y10T 24/4621; Y10T 24/4623; H01R 13/62; F16B 21/065; F16B 21/073; F16B 21/125; F16B 21/16; F16B 21/18; F16B 21/186

USPC .................. 403/326, 327, 372; 267/167, 174
See application file for complete search history.

(56) References Cited

U.S. PATENT DOCUMENTS

| | | | | |
|---|---|---|---|---|
| 4,148,593 | A * | 4/1979 | Clark | 408/204 |
| 4,678,210 | A * | 7/1987 | Balsells | 285/318 |
| 5,161,838 | A * | 11/1992 | Ely et al. | 292/327 |
| 5,411,348 | A * | 5/1995 | Balsells | 403/326 |
| 5,545,842 | A * | 8/1996 | Balsells | 174/372 |
| 5,727,821 | A * | 3/1998 | Miller | 285/318 |

(Continued)

FOREIGN PATENT DOCUMENTS

| | | |
|---|---|---|
| EP | 2259383 | 12/2010 |
| EP | 2458231 | 5/2012 |
| WO | WO 2009/126968 | 10/2009 |

OTHER PUBLICATIONS

Extended European Search Report from European Patent Office on corresponding EP application (EP13198442.9) dated Oct. 22, 2015.

*Primary Examiner* — Gregory Binda
*Assistant Examiner* — Nahid Amiri
(74) *Attorney, Agent, or Firm* — Klein, O'Neill & Singh, LLP

(57) ABSTRACT

The disclosure is directed to a coil spring locking connector offering multiple groove geometries to allow multiple connection positions along the direction of insertion. A connector with an external spring access opening is formed through the housing wall surface. The opening allows access to the coil spring to allow removal of the spring from the connector prior to removal of the connector from a locked position to prevent potential damage to connector components.

9 Claims, 4 Drawing Sheets

(56) References Cited

U.S. PATENT DOCUMENTS

| | | |
|---|---|---|
| 6,749,358 B2 * | 6/2004 | Balsells .................. 403/316 |
| 6,824,170 B2 * | 11/2004 | Lee ........................ 285/92 |
| 7,654,779 B2 * | 2/2010 | Sasaki et al. ............. 408/240 |
| 7,674,065 B2 * | 3/2010 | Schnedl et al. ........... 403/379.1 |
| 8,366,356 B2 * | 2/2013 | Novak et al. ............. 408/204 |
| 8,382,532 B2 * | 2/2013 | Sjostedt et al. ........... 439/817 |
| 8,505,893 B2 * | 8/2013 | Haimer .................... 269/54.3 |
| 2005/0212218 A1 | 9/2005 | Balsells |

* cited by examiner

LOCKING CONNECTORS AND RELATED METHODS

FIELD OF ART

The present invention is directed to connectors in which a spring is used as a medium to latch a pin or shaft to a housing. Specific disclosures are directed to locking connectors with structural mechanisms for unlocking.

BACKGROUND

In conventional spring based connectors, the connected parts are locked together in one position and are not permitted to move between multiple positions, such as being incapable of separating the pin from the housing without destroying the canted coil spring. Connectors can also include holding types and latching types in which separation of the pin from the housing is possible without destroying the spring. Furthermore, a forced removal of a locking connector may damage and shear the spring, resulting in sheared or mangled portions of the spring capable of and likely to damage the pin and/or housing upon removal by way of scoring, scratching, and embedding into the pin and/or housing surfaces.

SUMMARY

The connectors of the present device, system, and method are directed to locking connectors. The connectors disclosed herein offer a means to allow multiple connection positions along the direction of insertion, which may be useful when the application requires multiple stages of connection while ultimately maintaining a lock state from complete removal. The locking connectors of the present disclosure can further include means for removing the spring from the connector prior to removal of the connector from a locked position to prevent potential damage to the pin and/or housing.

Aspects of the present disclosure include a spring locking connector comprising a first body comprising a first body groove having a coil spring located therein and a second body comprising a second body first groove and a second body second groove, each groove of the second body having a tapered sidewall so that the two tapered sidewalls of the two second body grooves are located adjacent one another. The connector can comprise a connector first connected position when a portion of the coil spring protruding from the first body groove is located in the second body first groove and loaded by both the first body groove and the second body first groove, which together define a first common groove and a connector second connected position in which the coil spring is captured by the first body groove and the second body second groove, which together define a second common groove; the coil spring being loaded by both the first body groove and the second body second groove when in the second common groove. The connector wherein the first body is movable in a first direction relative to the second body to move to the connector first connected position and wherein the first body is locked from moving in a second direction relative to the second body, which is opposite the first direction, to disconnect from the second body.

The spring locking connector wherein the first body can be a housing having a bore having the first body groove formed therein.

The spring locking connector wherein the first body can be an elongated shaft having an insertion end.

The spring locking connector wherein the second body first groove and the second body second groove can be symmetrical about a line bisecting the two grooves.

The spring locking connector wherein the coil spring can comprise a plurality of coils each comprising a major axis and a minor axis and wherein the major axis of each of the plurality of coils are rotated from vertical when in the first common groove and the second common groove, and wherein vertical is defined by a line orthogonal to a lengthwise axis of the first body.

The spring locking connector wherein the second body first groove can be larger than the second body second groove.

The spring locking connector wherein the first body groove can comprise two sidewalls that are generally parallel to one another and a bottom wall located therebetween, and wherein the bottom wall can have a slanted surface.

A method of using a coil spring locking connector is further provided. The method can comprise the steps: providing a first body comprising a wall structure having a bore with a first body groove and providing a second body comprising a wall structure comprising a second body groove. The method can further comprise providing a coil spring located in a common groove defined by the first body groove and the second body groove; said coil spring comprising a plurality of coils and having a spring configuration when in the common groove and providing an opening through the wall structure of at least one of the first body or the second body and in communication with at least one of the first body groove or the second body groove, said opening allowing access to the coil spring located in the common groove. The method can further comprise projecting into the opening and modifying at least a coil of the coil spring to change the spring configuration of the coil spring to allow disconnection of the first body from the second body.

The method wherein the spring configuration changed can comprise one or more coils of the coil spring being cut.

The method can further comprise removing at least a coil section of the coil spring through the opening on the wall structure of the first body or the second body.

The method wherein the opening formed through the wall structure can be formed through part of a bottom wall of the first body groove or the second body groove.

In accordance with another aspect of the present disclosure, a coil spring locking connector is disclosed. The connector comprising a first body comprising a wall structure comprising a bore having a first body groove and a second body located in the bore of the first body comprising a wall structure comprising a second body groove. The connector can further comprise a coil spring positioned in a common groove defined by the first body groove and the second body groove. The connector can further comprise an opening formed through the wall structure of at least one of the first body or the second body and in communication with the first body groove or the second body groove, said opening allowing access to the coil spring located in the common groove. The connector wherein locking connection between the first body and second body is achieved when the spring is in the common groove.

The coil spring locking connector wherein the first body groove can comprise two sidewalls that are generally parallel to one another.

The coil spring locking connector wherein the second body can be an elongated shaft comprising a tapered insertion end.

The coil spring locking connector wherein the opening on the wall structure can have a width of about 25% to about 75% of a width of the first body groove.

The coil spring locking connector wherein the opening on the wall structure can have a length of about 5% to about 35% of an arc circle of the first body groove.

A method of using a coil spring locking connector is further provided. The method can comprise providing a first body comprising a first body groove have a coil spring located therein and providing a second body comprising a second body first groove and a second body second groove, each groove having a tapered sidewall and wherein the tapered side wall of the second body first groove and of the second body second groove are located adjacent one another. The method can further comprise the step of connecting the first body to the second body by positioning the first body and second body so that a portion of the coil spring protruding from the first body groove is trapped by the second body first groove; wherein the first body groove and the second body first groove define a first common bore; and moving the first body and second body relative to one another to move the protruding portion of the coil spring to a second common groove defined by the first body groove and the second body second groove. The method can further comprise separating the first body from the second body after the coil spring is in the second common groove; and wherein the coil spring is loaded when in the first common groove and in the second common groove.

The method can further comprise maintaining a major axis of the coil spring turned from vertical when in the first common groove and the second common groove, and wherein vertical is defined by a line orthogonal to a lengthwise axis of the first body.

The method wherein the separating step can comprise moving the first body in a second direction to separate from the second body, which is opposite the first direction to connect the first body to the second body.

The method wherein the first body can be a housing comprising a bore.

DESCRIPTION OF DRAWINGS

These and other features and advantages of the present device, system, and method will become appreciated as the same becomes better understood with reference to the specification, claims and appended drawings wherein:

DETAILED DESCRIPTION OF THE ILLUSTRATED EMBODIMENTS

The detailed description set forth below in connection with the appended drawings is intended as a description of the presently preferred embodiments of connectors provided in accordance with aspects of the present device, system, and method and is not intended to represent the only forms in which the present device, system, and method may be constructed or utilized. The description sets forth the features and the steps for constructing and using the embodiments of the present device, system, and method in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

Figure 1:
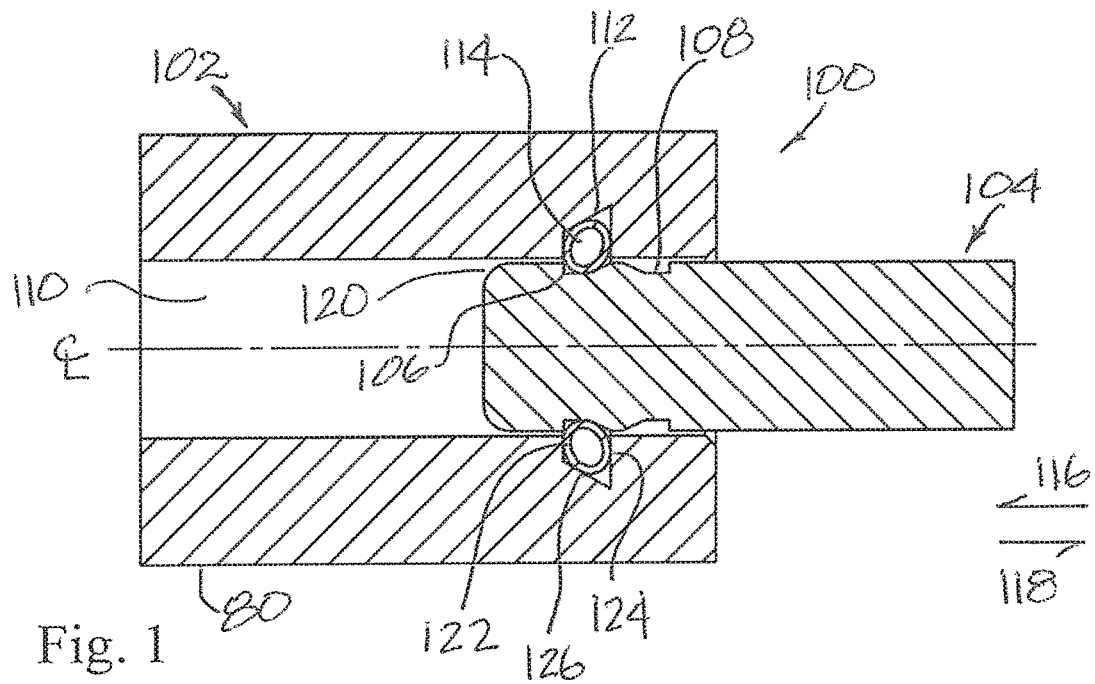
FIG. 1 shows a spring connector with two pin grooves and a spring in the first groove on the pin, closer to the pin insertion end, and in the housing groove.

FIG. 1 shows a connector 100 provided in accordance with aspects of the present disclosure, which has a housing 102 and a pin 104, which may also be referred to as a shaft or a rod. As shown, the pin 104 comprises two pin grooves, a first or primary pin groove 106 and a second or secondary pin groove 108. The housing 102 has a housing body 80 with a housing groove 112 formed inside a bore 110. The connector 100 is shown in a latched position with a coil spring 114 positioned between a first common groove defined by the housing groove 112 and the first pin groove 106. The pin 104 is latched by moving the pin in the first direction 116 while holding the housing stationary to capture the spring 114 in the first common groove. As shown, the pin 104 is locked to the housing and removal of the pin by moving in the second direction 118 while holding the housing stationary is not possible without destroying the spring. Thus, the connector 100 may be referred to as a locking connector in that the pin cannot be removed when in the first common groove by simply reversing the direction of the pin. A forceful attempt can destroy the coil spring.

The coil spring 114 is originally held in the housing groove 112 prior to the connection. In other words, the spring 114 is housing mounted as the spring is positioned in the housing groove prior to connection. In other examples, the spring is pin mounted by providing a single deep pin groove and mounting the coil spring on the pin groove before connection to the housing. In the pin mounted configuration, a pair of housing grooves are provided in the bore of the housing, i.e., a first or primary housing groove and a second or secondary housing groove located next to the first housing groove. Prior to inserting the pin 104 to the housing, the major axes of each coil of the plurality of coils, i.e., the longer of two axes, are generally orthogonal to the housing centerline C. As shown, the coil spring 114 is a canted coil spring comprising a plurality of canted coils. The spring coils of the spring 114, for example the major axes of the coils, turn on insertion of the pin 104, which has a tapered insertion end 120 that contacts and rotates the spring. The spring 114 remains at a slanted angle relative to the lengthwise housing axis due to the constrained space in the first common groove, which is defined by the housing groove 112 and the first pin groove 106. Removal of the pin 104 from the housing 102 from this state is not allowed due to the constrained housing groove and the inability for the spring coils to turn back pass the upright position. In other words, the longer axes of the coils cannot rotate to turn past perpendicular to the housing lengthwise axis to enable withdrawal of the pin away from the housing without destroying the spring. Looking at the upper common groove, the coil shown cannot turn counter-clockwise to enable retraction of the pin from the housing. The coil shown has a major axis that is turn from vertical, which is understood to be turned from a position in which the major axis is orthogonal to the lengthwise axis.

As shown, the housing groove 112 comprises two sidewalls 122, 124 and a bottom wall 126 located therebetween. In one example, the two sidewalls 122, 124 are generally parallel to one another. As shown, the two sidewalls are generally perpendicular to the housing lengthwise axis or centerline ₵. In other examples, the housing groove has a different configuration, such as a flat bottom wall or two sidewalls that slightly converge or diverge. One sidewall can also be vertical while the other slanted.

The first pin groove 106 comprises two sidewalls 128, 130 and a bottom wall 132 located therebetween. As shown, the first sidewall 128 is generally orthogonal to the pin centerline, the bottom wall 132 is generally parallel to the pin centerline, and the second sidewall 130 is tapered relative to the pin centerline. Thus, the second sidewall 130 is angled relative to the first sidewall 128 and the two sidewalls are understood to converge in the direction of the shaft centerline. In one example, the second pin groove 108 has the same but reversed orientation as the first pin groove 106. The two pin grooves 106, 108 are separated from one another by a landing 134. The two pin grooves 106, 108 have equal groove widths. In another example, the two pin grooves 106, 108 have equal depths. More preferably, the two pin grooves have equal groove widths and equal groove depths. In one example, the diameter of the landing 134 is the same as the nominal pin diameter. In another example, the landing is slightly smaller than the nominal pin diameter. The two grooves are symmetrical about a line drawn at the landing. In other examples, the grooves have different groove geometries. For example, the first pin groove can be larger than the second pin groove.

Figure 2:
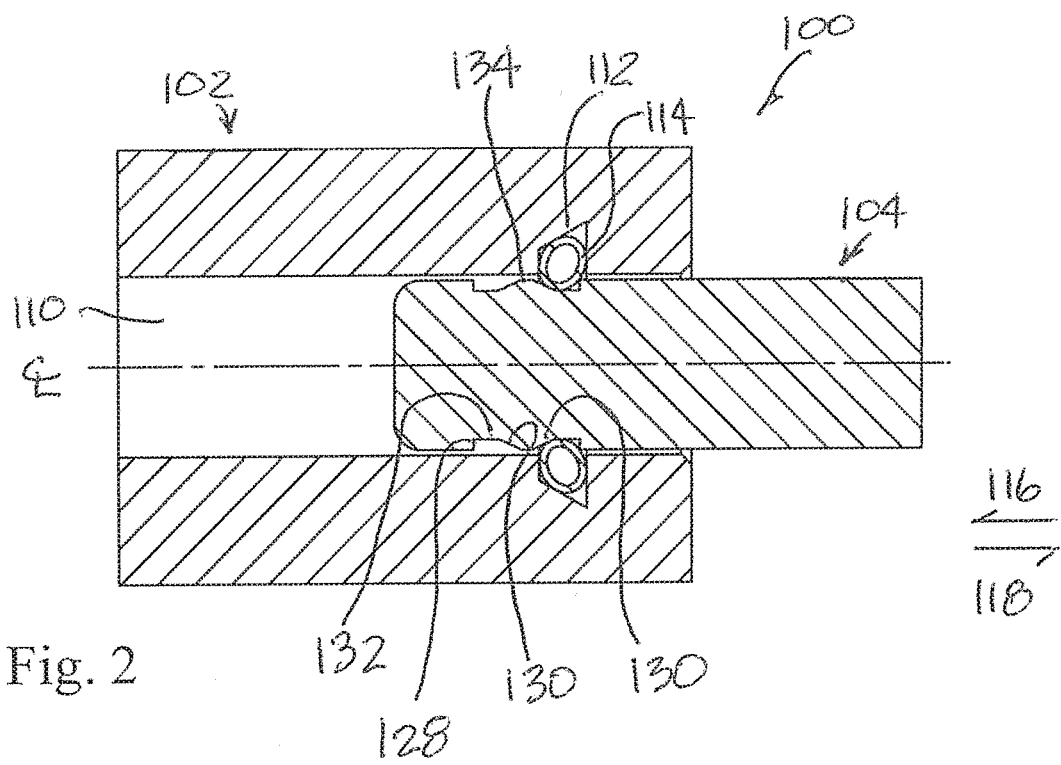
FIG. 2 shows the connector of FIG. 1 with the coil spring in the second groove on the pin and in the housing groove.

FIG. 2 shows the locking connector 100 of FIG. 1 with the spring 114 located in the second common groove, which is defined by the housing groove 112 and the second pin groove 108. The connector 100 may be moved to the second common groove by further insertion of the pin 104 in the first direction 116 further into the bore 110 of the housing 102 so that the spring 114 moves from the first pin groove 106 to the second pin groove 108. The spring coils of the spring 114, upon further insertion of the pin 104 in the first direction 116, do not need to turn back pass the upright position during the further insertion and there is sufficient room for the spring to deflect further into the housing groove 112 during the pin movement in the first direction 116. In one example, the tapered sidewall 130 lifts the coils of the spring 114 during the pin movement further in the first direction 116 to move the connector and the spring 114 to the second common groove, i.e., second connector position from the first connector position. In the spring second position where the spring is located in the second common groove between the housing groove 112 and the second pin groove 108, the spring remains loaded or constrained by the second common groove. In other words, the second common groove geometry is such that the coils of the spring are biased by the groove surfaces of the housing groove 112 and the second pin groove 108. As shown, each spring coils of the coil spring 114 simultaneously contacts both the housing groove 112 and the second pin groove 108. The major axes or the longer of the two spring axes of the coils remain in the turned or rotated position at the spring second position, as shown in FIG. 2.

However, unlike prior art locking connectors, the present connector allows the pin to move in the second direction 118, opposite the first direction 116, even though the spring is constrained or loaded in the second spring position. In other words, the pin 104 is allowed to move in the second direction 118 even though the major axes of the spring coils remained slanted in the second common groove. In the present embodiment, the pin can be moved so that the spring is repositioned back in the first groove, i.e., back to the position shown in FIG. 1, from the second common groove, shown in FIG. 2. In the present embodiment, the tapered surface 130 of the second pin groove 108 allows the spring coils to gradually deflect further into the housing groove 112 without having to turn back pass the upright position. In other words, looking at the upper common groove of FIG. 2, the major axis does not turn counter-clockwise past vertical for the pin to move in the second direction 118 to separate from the housing. The tapered sidewall 130 of the second pin groove 108 and the tapered bottom wall 126 of the housing groove 112 force the coils to deflect in the clockwise direction when retracing the pin and when viewing the upper groove portion of the second common groove. Comparing the first common groove (FIG. 1) to the second common groove (FIG. 2) and in moving the pin in the second direction 118 from both configurations, the spring 114 is contacted by a straight or vertical sidewall 128 when in the first common groove and by the tapered sidewall 130 when in the second common groove. Movement against the tapered sidewall 130 allows the spring to further deflect.

Thus, an aspect of the present system, device and method is a connector 100 comprising a housing 102 comprising a bore 110 comprising a housing groove 112, a pin 104 comprising an insertion end 120, a first pin groove 106, and a second pin groove 108 and wherein a coil spring 114 is held in a first spring position, such as a first common groove, by the combination housing groove and first pin groove. The spring may be an axial canted coil spring or a radial canted spring. The spring 114 in the first spring position has a major axis that is turned clockwise from an upright position, when viewing the upper spring section above the pin centerline of FIG. 1. The connector 100 comprises a second spring position wherein the spring 114 is held by the combination housing groove and second pin groove, such as a second common groove as shown in FIG. 2, and the major axis remains turned in a clockwise orientation. The spring may be moved from the first spring position (FIG. 1) to the second spring position (FIG. 2) by moving the pin in the first direction 116 further into the bore 110 of the housing 102. The spring coils, in the second spring position, also contact both the housing groove 112 and the second pin groove 108. As shown, the spring contacts the two sidewalls 122, 124 and the bottom wall 126 of the housing groove 112 in the second spring position. The spring is further understood to be loaded in the second spring position by being compressed by both the housing groove 112 and the second pin groove 108. In other words, the second common groove is generally the same size, such as having the same width, the same depth, or both as the first common groove except for the reversed configuration. In other words, the location of the tapered sidewall between the first pin groove and the second pin groove are reversed.

The present connector 100 is sized and shaped to permit the pin 104 to still move in a second direction 118 from the second spring position (FIG. 2) in which the spring is loaded by the second common groove, opposite a first direction 116, to separate from the housing without turning the spring axis past vertical. In one example, a sloped sidewall 130 opposite a locking sidewall 128 is provided to allow the spring 114 to further compress rather than expand and counter-rotate to enable separation. As shown in FIGS. 1 and 2, the tapered sidewall 130 of the first groove 106 is located adjacent to the tapered sidewall 130 of the second groove 108. The two vertical locking sidewalls 128 are shown located further away from one another than the two tapered sidewalls 130.

In one example, the second groove 108 comprises a tapered sidewall 130 that deflects the spring coils while maintaining the major axis turned clockwise, as shown in the upper common groove of FIG. 2, during withdrawal of the pin 104 to permit separation. In another example, the first pin groove 106 and the second pin groove 108 have about the same groove depth, measure from a common or similar reference point. Also shown is a first pin groove and a second pin groove with the same groove width. In an example, the second pin groove 108 has a generally vertical wall 128, which is generally perpendicular to the pin lengthwise axis, located opposite the tapered sidewall 130 with a bottom wall located therebetween. In yet another example, the first pin groove 106 and the second pin groove 108 are symmetrical about a vertical line drawn between the first pin groove and the second pin groove. In still yet another example, the first pin groove and the second pin groove are equal in size, such as equal in width, in depth, or both width and depth. In yet another embodiment, the housing comprises a first housing groove and a second housing groove and the pin comprises a single groove so that the alternative connector is reversed from the connector of FIG. 1 with the spring being pin or shaft mounted instead of housing mounted.

A still further aspect of the present connector is one in which the pin and the housing have a spring trapped in a first common groove and requires the spring to move to a second common groove then returning to the first common groove before allowing the pin to separate from the housing without destroying the spring. In a particular example, the spring is loaded in both the first common groove and in the second groove. The spring is biased by the housing groove and the pin groove in both the first common groove and the second common groove.

Figure 3:
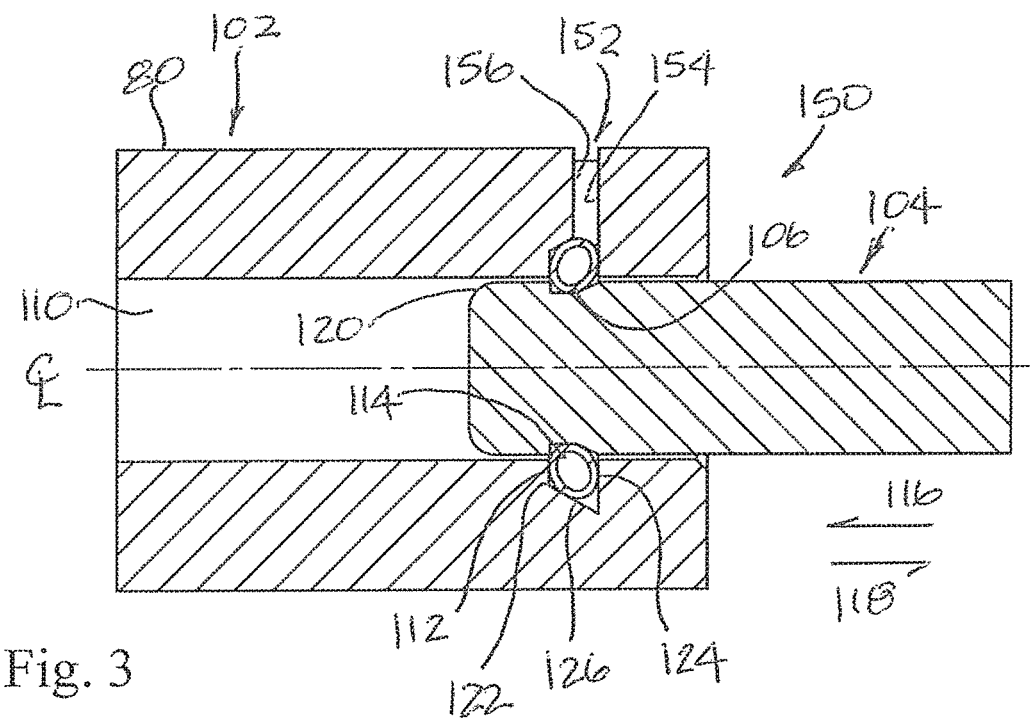
FIG. 3 shows an alternative spring connector with a slot through a section of the housing and through the housing spring groove.

With reference now to FIG. 3, a connector 150 provided in accordance to an alternative embodiment is shown, which comprises a housing 102 and a pin 104 with a spring 114 loaded in the common groove defined by the housing groove 112 and the primary pin groove 106. The connector 150 shown can be a locking connector in that once the pin 104 is latched to the housing 102 by moving the pin in the first direction 116 and capturing the coil spring 104 in the common groove, the pin cannot be removed in the opposite direction 118 without first changing the spring configuration or characteristics.

In an example, the housing 102 has a bore 110 with a housing groove 112 having a slot 152 formed through a section of the body 80, such as through the wall structure, of the housing 102 and a section of the housing groove 112. In the example shown, the slot 152 is formed through the wall structure and through a portion of the bottom wall 126 of the housing groove 112. The slot 152 has a length L (FIG. 4) and a width W defined by two wall surfaces 154, 156. In one example, one of the wall surfaces 154 is coincident, such as being coplanar, with one of the sidewalls 126 of the housing groove. The width W of the slot 152 may be about 20% to about 75% of the width of the housing groove. The length L of the slot 152 may be about 5% to about 35% of the arc circle of the housing groove.

Figure 4:
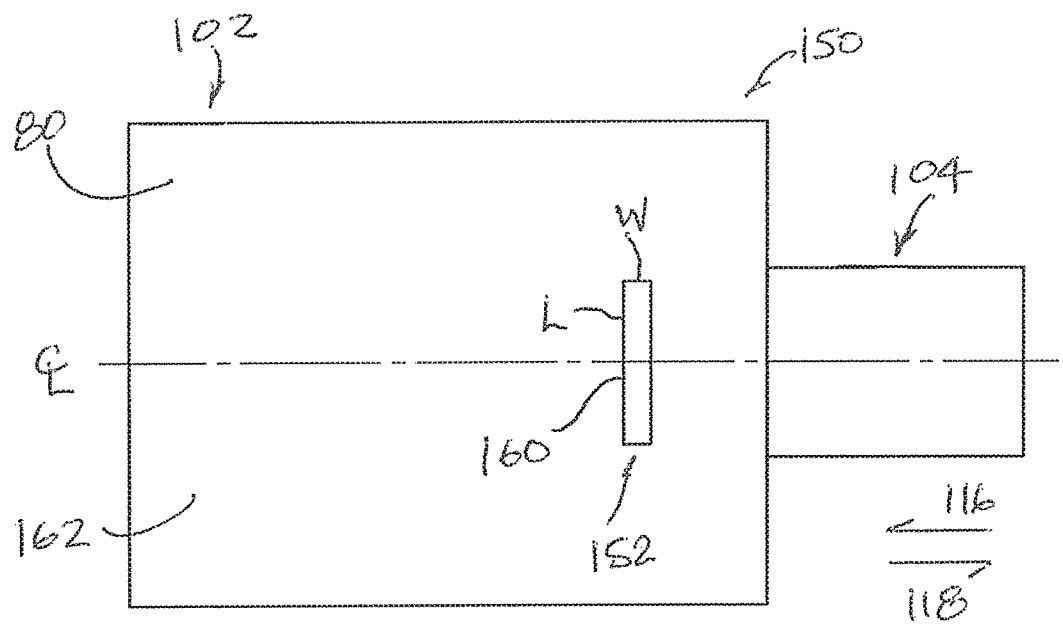
FIG. 4 shows a top plan view of the spring connector of FIG. 3 with a slot through a section of the housing and the housing spring groove.

With reference to FIG. 4, the slot 152 has a perimeter 160 defining an opening on an exterior surface 162 of the housing body 80 comprising a length L and a width W that communicates with the housing groove 112. The slot 152 provides access to the coil spring 114 so that the spring 114 may be cut and removed through the slot 152 to allow removal of the pin 104 from the housing 102. The spring's characteristics can therefore be changed before removal of the pin from the housing. For example, the spring can but cut into smaller pieces and removed through the slot 152 to then allow separation. In some examples, the slot 152 is sized and shaped to allow a cutting tool, such as a wire cutter or a laser, to be used to cut one or more coils of the coil spring 114. After one section of the spring is cut and removed, additional sections may be cut by manipulating the remaining spring sections to move under the slot to permit further cutting and removal of the spring. After a sufficient section or sections of the spring are removed, the spring no longer acts as an impediment to maintaining the connector in a locked state. This allows the pin 104 to be removed by moving the pin in the second direction 118 to remove the pin from the housing. By removing portions of the spring through the slot 152 instead of simply plastically deforming the spring, such as by applying a removal force to the pin that can deform the spring while leaving the spring intact, the risk of damaging the pin or housing due to portions of the spring coils scoring, scratching, or embedding into the pin and housing surfaces during a forced removal from the lock position is reduced and/or eliminated.

FIG. 4 shows a top view of the connector 150 of FIG. 3 with the slot 152 having a perimeter 160 formed through a section of the housing body 80 and the housing groove 112. The slot 152 may embody other shapes and sizes other than a rectangular shape provided the shaped slot allows access to the spring or coils located inside the housing groove 112, pin groove, or both. For example, the slot 152 should be sized to enable a cutting instrument to pass through the slot to access the spring so that the spring may be cut by the cutting instrument to enable removal of section or sections of the spring through the slot. In some examples, the spring 114 is shaft or pin mounted and the opening or slot 152 is provided through the housing for accessing the spring. In other words, the spring can be piston mounted and still be accessed through the opening formed through the wall structure of the housing to access the spring.

In an alternative example, the pin 104 comprises a wall structure comprising a bore. Further, a slot is provided through the wall structure from inside the bore and in communication with the pin groove 106. Thus, access to the spring can be through the opening or slot formed through the wall structure of the pin groove. In a still further example, the connector can have a slot formed through the wall structure of the housing and of the pin. In other words, the alternative connector can have two access slots or openings for accessing the spring to modify the spring configuration or characteristics.

Figure 5:
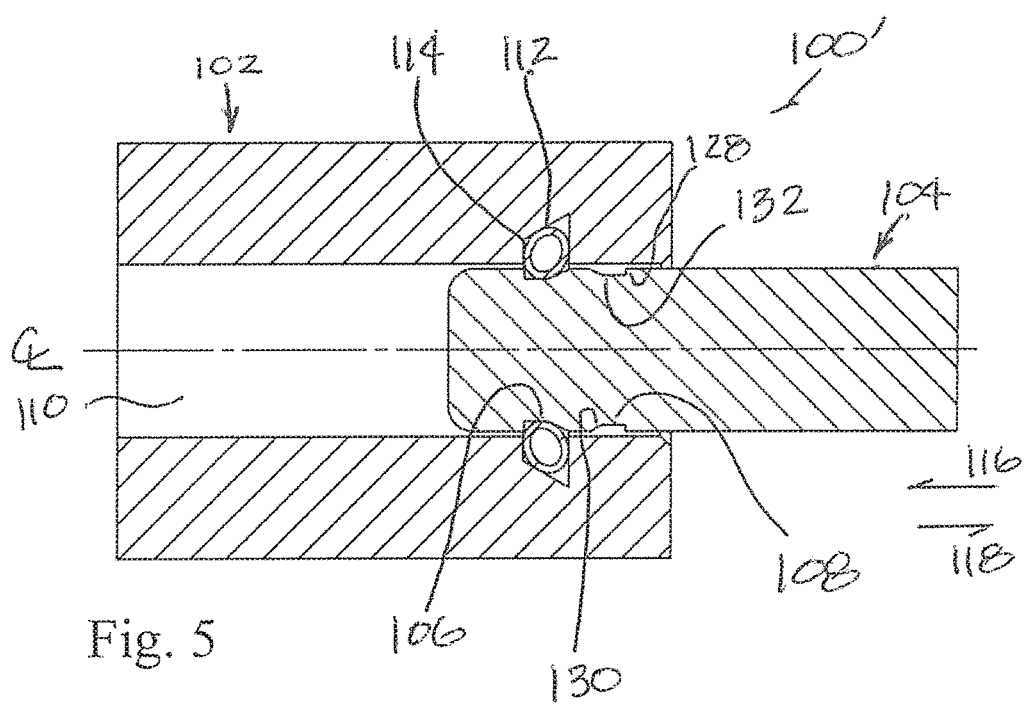
FIG. 5 shows an alternative spring connector.

FIG. 5 shows an alternative connector 100' provided in accordance with aspects of the present disclosure, which has a housing 102 and a pin 104, similar to the connector of FIGS. 1 and 2. In the present embodiment, the first pin groove 106 and the second pin groove 108 are sized with different widths, different depths, or both different widths and different depths. In still other examples, the second pin groove 108 has a different groove geometry than the first pin groove 106. For example, the second pin groove 108 may have a bottom wall 132 with multiple distinct planar sections that vary by a few degrees or the bottom wall 132 may form with the slanted sidewall 130. As shown, the housing groove 112 has the same configuration as the housing groove of FIGS. 1 and 2. Also as shown, the first or primary pin groove 106 is larger than the second or secondary pin groove 108. In other examples, the first or primary pin groove 106 is smaller than the second or secondary pin groove 108. By larger or smaller, it is understood to mean either a larger or smaller in groove width, in groove depth, or both groove width and groove depth.

In the present connector 100', the load applied on the coil spring 114 at the first common groove defined by the housing groove 112 and the primary pin groove 106 is less than the load applied on the coil spring 114 at the second common groove defined by the housing groove 112 and the second pin groove 108. The reason is that the first common groove is larger than the second common groove as the primary pin groove 106 is larger than the second pin groove 108. Whether when located in the first common groove or the second common groove, the spring is loaded by the housing groove and the corresponding pin groove while remaining in a slanted state, i.e., not rotate back past vertical. By varying the first common groove and the second common groove geometries, the spring can be caused to vary in deflection while in such grooves and thus affect the forces required to move from one pin groove to another.

Thus, an aspect of the present system, device and method is a connector 100 comprising a housing comprising a bore comprising a housing groove, a pin comprising an insertion end, a first pin groove, and a second pin groove and wherein a coil spring is held in a first spring position, such as a first common groove, by the combination housing groove and first pin groove. The spring may be an axial canted coil spring or a radial canted spring. The spring in the first spring position has a major axis that is turned clockwise from an upright position, when viewing the upper spring section above the pin centerline of FIG. 5. The connector 100' comprises a second spring position wherein the spring is held by the combination housing groove and second pin groove and is held with the major axis turned clockwise so that it is not orthogonal to the housing lengthwise axis. In the second common groove as shown in FIG. 2, the major axis of the spring remains turned in a clockwise orientation so that it is not orthogonal to the housing lengthwise axis. In one example, the first common groove is larger than the second common groove so that the spring is loaded less when in the first common groove compared to when in the second common groove. In another example, the first common groove is smaller than the second common groove so that the spring is loaded more when in the first common groove compared to when in the second common groove. In both spring positions, the spring is loaded and contacts both the housing groove and the corresponding pin groove. For example, both the housing groove and the corresponding pin groove constrain the spring to keep the coils slanted in the first common groove and in the second common groove.

The spring may be moved from the first spring position to the second spring position by moving the pin in the first direction 116 further into the bore 110 of the housing 102 to be captured by the second common groove, i.e., by the housing groove 112 and the second pin groove 108. The transit force to move the spring from the first position to the second position is lower when moving in the first direction 116 than in the second direction 118. Among other things, the spring in the second position is loaded a greater amount than when in the first position due to the second common groove being smaller than the first common groove. In some examples, the transit force is reversed by providing a larger second common groove than the first common groove. The spring is loaded in both spring positions, such as being constrained by the common groove and not allowed to relax to a point in which the major axis of the spring rotates to a generally orthogonal position to the housing lengthwise axis.

For the connectors discussed herein, the housing 102 may be made from an elastomeric material, a polymeric, plastic material, or from a metal material. The pin 104 may also be made from an elastomeric, polymeric, plastic material, or a metal material. The housing and the pin may also be made from different materials. For example, the housing may be made from a plastic material while the pin is made from a metal material.

Wire types usable herein to form the spring 114 include copper, copper alloy, aluminum, aluminum alloy, gold, gold alloy, silver, silver alloy, brass, and brass alloy. Additional wires include steel material, such as medical grade stainless steel, titanium, noble metals such as platinum or conventional implantable grade materials with noble metal coatings, such as platinum over stainless steel. The wire may also be a multi-metallic wire in which a base core material is surrounded by one or more other materials. In some examples, the spring has an inner core and an outer layer having different material compositions with the outer layer comprising at least one of platinum, iridium, rhodium, rhenium, ruthenium and palladium. The outer layer should have sufficient thickness to provide the spring with an electrical resistance that is within 20% or less of a spring made entirely of at least one of platinum, iridium, rhodium, rhenium, ruthenium and palladium. For electrical connector applications, the spring may be used with a housing and a pin or shaft made from stainless steel type 316L, MP35N, platinum-iridium, titanium or other conductive materials, including being plated or coated with a highly conductive metal, such as silver, copper, gold, and their alloys. The spring 114 may be one of the springs disclosed in U.S. Pat. Nos. 4,655,462, 4,826,144, 4,876,781, and 4,964,204, the contents of which are expressly incorporated herein by reference. In use, the pin may be attached to a first source and the housing to a second source, which can be any number of presently available commercial products or components. Connection between the pin and the housing effectively connects the first source to the second source, such as a power supply to a circuit board. The connector may be a mechanical connector to physically retain the pin to the housing and the first source retained to the second source. The connector may also include electrical carrying capabilities so that in addition to physically retaining the pin to the housing and the first source to the second source, electrical signals or currents may be transferred between the pin and the housing and between the first source and the second source.

Figure 6A:
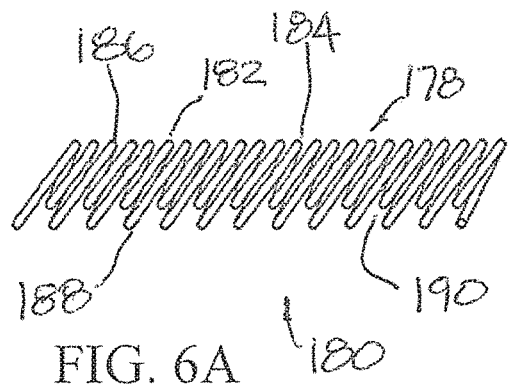
FIGS. 6A and 6B show a side view and a perspective view, respectively, of a canted coil spring length.
Figure 6B:
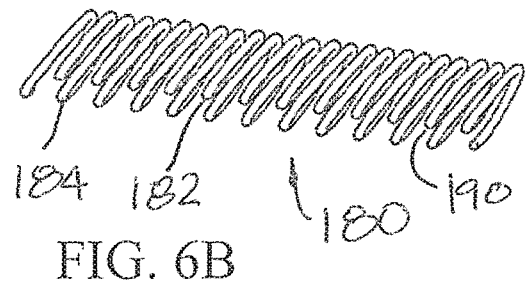

FIG. 6A illustrates a side view of a spring length 180 and FIG. 6B illustrates an isometric view of the spring length 180 of a coil spring with a plurality of coils 178 that include alternating smaller coils 182 and relatively larger coils 184 being eccentric or displaced relative to one another when viewed in the direction of the spring centerline C. Said differently, the smaller coils 182 are aligned with the first edge 186 and recessed from the second edge 188 by a gap 190.

Figure 6C:
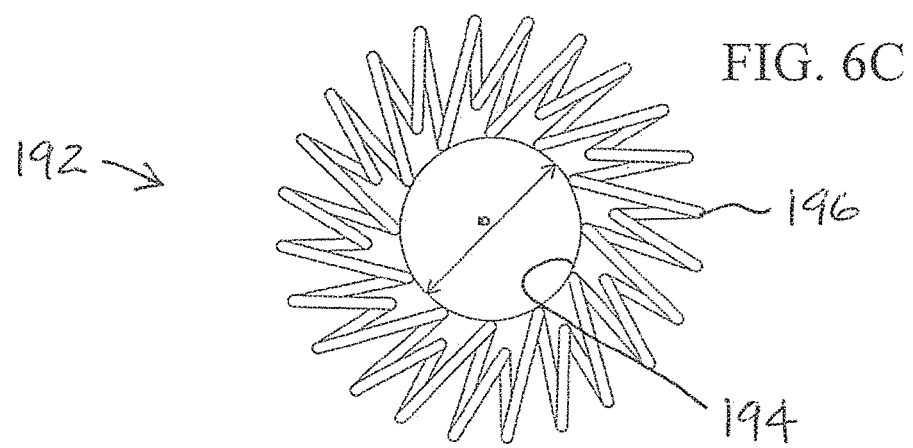
FIGS. 6C and 6D show a side view and a perspective view, respectively, of a spring ring formed by joining the two ends of the spring length of FIGS. 6A and 6B.
Figure 6D:
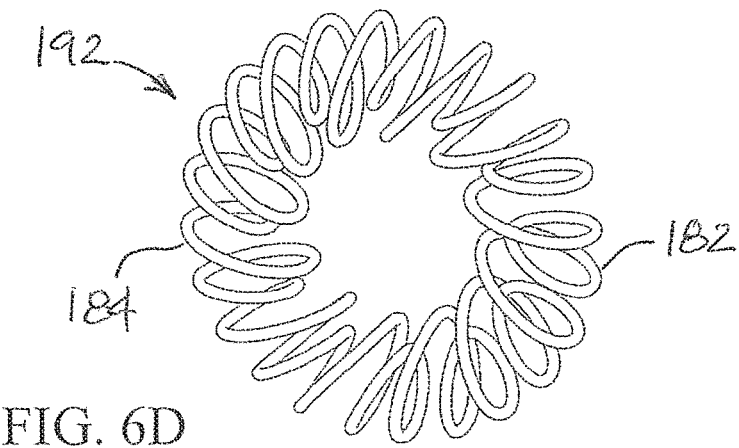

FIG. 6C shows a side view of a spring ring 192 and FIG. 6D shows an isometric view of the spring ring 192 of FIG. 6C, which can be generated from the coil spring length 180 illustrated in FIGS. 6A and 6B, such as by joining the spring length's two free ends. As shown, the spring ring 180 has a ring inner perimeter 194 and a ring outer perimeter 196. The ring inner perimeter 194 and the ring outer perimeter 196 are shown. The inner perimeter 194 is defined by the projection of the inside portions of the larger coils 184 while the outer perimeter 196 is defined by the outside portions of both the smaller coils 182 and the larger coils 184. The spacing for the coils 178, such as the larger coils 184, that align along the inner perimeter 194 of the present spring ring 192 is twice the spacing of a typical coil spring with a uniform coil diameter along the inside perimeter. However, the spacing for the coils 182, 184 that align along the outer perimeter 196 of the present spring ring 192 is the same as for the coils of a typical coil spring with a uniform coil diameter along the inside perimeter with the same coil density per unit length. The resulting configuration of the present spring ring 192 is such that the tendency of the coils to butt is lower than the tendency of the coils of a constant coil cross section coil spring ring made of a similar material, targeting a similar electromagnetic interference shielding capacity and having similar inner and outer perimeters and a similar wire cross section, to butt.

A still yet further aspect of the present disclosure is a method for producing a coil spring ring with optimal inner perimeter dimension or value for use with a connector disclosed elsewhere herein. The method comprises forming a spring length with a plurality of coils and canting the coils along a same direction to form canted coils and wherein the canted coils include a plurality of at least two coil types, including a plurality of a first coil type and a plurality of a second coil type. A coil type is understood to refer to either a particular shaped coil, such as being D-shaped or elliptical shaped, and/or to two similar shapes but different coil dimensions, such as different coil heights and coil widths. Connecting the two free ends of the coil length to form a coil spring ring having an inner perimeter and an outer perimeter and wherein the inner perimeter is defined by less than the total number of coils that form the spring ring. For example, if the spring ring has thirty five total canted coils, then the inner perimeter is defined by fewer than thirty five coils that align along the inner perimeter. In an embodiment and assuming the second coil type is recessed from the inner perimeter by a gap, only the first coil type is aligned along the inner perimeter. In another example, a third coil type or a fourth coil type or both but not the second coil type is or are aligned with the first coil type to define the inner perimeter. The resultant spring ring will have a minimum reachable inner perimeter being defined as the minimum value of said inner perimeter that can be reached without the coils having butted and wherein said minimum reachable inner perimeter is smaller than the minimum reachable inner perimeter of a constant coil cross section coil spring ring made of a similar material and having a similar total number of coils and coil major and minor axes similar to those of either said first or second pluralities of coils.

The present spring ring may be used with ever smaller pin, shaft, or rod outer diameter than previously possible by having a smaller inner perimeter. In a particular example, the present spring ring has spring coils that alternate between smaller coils and relatively larger coils. The different sized coils allow the coil spacing along the inner perimeter to be spaced to permit a tighter radius. Additionally, the performance of the present coil spring ring mounted in or on a shaft having a diameter equal to the ring inner perimeter may be less sensible to the shaft tolerances because such shaft tolerances represent a smaller percentage of the larger coils as the larger coils have a wider working range of deflection. The spring 114 may be one of the springs disclosed in co-pending U.S. application Ser. No. 14/078,125, filed Nov. 12, 2013, the contents of which are expressly incorporated herein by reference.

The alternating coil spring length 180 and spring ring 192 can be used in the connector application to achieve different forces at different deflection amounts during different stages of assembly or disassembly. For example, the spring ring 192 disclosed in FIGS. 6A-6D may be used with a connector having a first common groove and a second common groove, as disclosed above, to generate different transit forces for moving the spring from a first spring position to a second position and then back to the first spring position before removing the pin from the housing while constraining the spring in both spring positions.

Although limited embodiments of connector assemblies and their components have been specifically described and illustrated herein, many modifications and variations will be apparent to those skilled in the art. For example, the various connectors while shown as having a housing mounted coil spring may instead be a pin mounted coil spring and wherein the housing has a primary housing groove and a secondary housing groove. Furthermore, while the housing groove and the pin grooves are disclosed with certain groove sizes and geometries, different sizes and different geometries are contemplated. Furthermore, it is understood and contemplated that features specifically discussed for one connector embodiment may be adopted for inclusion with another connector embodiment, provided the functions are compatible. For example, while a slit is discussed with FIGS. 3 and 4, it may be included in the embodiment of FIGS. 1 and 2 or in FIG. 5 Accordingly, it is to be understood that the connector assemblies and their components constructed according to principles of the disclosed device, system, and method may be embodied other than as specifically described herein. The disclosure is also defined in the following claims.

What is claimed is:

1. A method of using a coil spring locking connector comprising:
   providing a first body comprising a wall structure having a bore with a first body groove;
   providing a second body comprising a wall structure comprising a second body groove;
   providing a coil spring located in a common groove defined by the first body groove and the second body groove; said coil spring comprising a plurality of coils and having a spring configuration when in the common groove;
   providing an opening through the wall structure of at least one of the first body or the wall structure from inside a bore of the second body and in communication with at least one of the first body groove or the second body groove, said opening allowing access to the coil spring located in the common groove; and
   projecting into the opening and modifying at least a coil of the coil spring to change the spring configuration of the coil spring to allow disconnection of the first body from the second body.

2. The method according to claim 1, wherein the spring configuration changed comprises one or more coils of the coil spring being cut.

3. The method according to claim 1, further comprising removing at least a coil section of the coil spring through the opening on the wall structure of the first body or the second body.

4. The method according to claim 1, wherein the opening formed through the wall structure is formed through part of a bottom wall of the first body groove or the second body groove.

5. A coil spring locking connector comprising:
   a first body comprising a wall structure comprising a bore having a first body groove;
   a second body located in the bore of the first body comprising a wall structure comprising a second body groove;
   a coil spring positioned in a common groove defined by the first body groove and the second body groove;
   an opening formed through the wall structure of at least one of the first body or the wall structure from inside a bore of the second body and in communication with the first body groove or the second body groove, said opening allowing access to the coil spring located in the common groove;
   wherein locking connection between the first body and second body is achieved when the spring is in the common groove.

6. The coil spring locking connector of claim 5, wherein the first body groove comprises two sidewalls that are generally parallel to one another.

7. The coil spring locking connector of claim 5, wherein the second body is an elongated shaft comprising a tapered insertion end.

8. The coil spring locking connector of claim 5, wherein the opening on the wall structure has a width of about 25% to about 75% of a width of the first body groove.

9. The coil spring locking connector of claim 5, wherein the opening on the wall structure has a length of about 5% to about 35% of an arc circle of the first body groove.

* * * * *

UNITED STATES PATENT AND TRADEMARK OFFICE
CERTIFICATE OF CORRECTION

PATENT NO. : 9,312,630 B2
APPLICATION NO. : 14/109730
DATED : April 12, 2016
INVENTOR(S) : Michelle Huang Page 1 of 1

It is certified that error appears in the above-identified patent and that said Letters Patent is hereby corrected as shown below:

In the specification

In column 4, line 47, delete "C." and insert -- $\mathfrak{C}_{..}$ --, therefor.

In column 10, line 43, delete "C." and insert -- $\mathfrak{C}_{..}$ --, therefor.

In column 12, line 12, delete "5" and insert -- 5. --, therefor.

Signed and Sealed this
Twenty-third Day of August, 2016

Michelle K. Lee
*Director of the United States Patent and Trademark Office*